(12) United States Patent
Miyamae et al.

(10) Patent No.: US 11,394,527 B2
(45) Date of Patent: Jul. 19, 2022

(54) BLOCKCHAIN PROGRAM AND BLOCKCHAIN METHOD

(71) Applicant: FUJITSU LIMITED, Kawasaki (JP)

(72) Inventors: Takeshi Miyamae, Kawasaki (JP); Masahisa Tamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 763 days.

(21) Appl. No.: 16/273,204

(22) Filed: Feb. 12, 2019

(65) Prior Publication Data
US 2019/0305933 A1  Oct. 3, 2019

(30) Foreign Application Priority Data
Mar. 29, 2018  (JP) .............................. JP2018-063985

(51) Int. Cl.
*H04L 29/06* (2006.01)
*H04L 9/06* (2006.01)
*G06Q 20/06* (2012.01)

(52) U.S. Cl.
CPC ....... *H04L 9/0637* (2013.01); *G06Q 20/0658* (2013.01)

(58) Field of Classification Search
CPC ... H04L 9/0637; H04L 63/12; H04L 2209/38; H04L 9/3239; G06Q 20/0658; G06Q 2220/00
See application file for complete search history.

(56) References Cited

U.S. PATENT DOCUMENTS

| 10,469,487 | B1* | 11/2019 | Griffin | ................ H04L 63/061 |
| 10,855,473 | B1* | 12/2020 | Griffin | ................ H04L 9/3239 |
| 2007/0282743 | A1* | 12/2007 | Lovelett | ............... G06Q 20/102 705/40 |
| 2013/0198853 | A1* | 8/2013 | McKeen | ................ G06F 21/72 726/26 |
| 2018/0117446 | A1* | 5/2018 | Tran | ..................... A42B 3/0433 |
| 2018/0323964 | A1 | 11/2018 | Watanabe et al. | |
| 2019/0081793 | A1* | 3/2019 | Martino | ............... G06Q 20/065 |

(Continued)

FOREIGN PATENT DOCUMENTS

WO  2017/082238  5/2017

OTHER PUBLICATIONS

JPOA—Office Action of Japanese Patent Application No. 2018-063985 dated Oct. 19, 2021 with English Machine translation.
(Continued)

*Primary Examiner* — Mahfuzur Rahman
(74) *Attorney, Agent, or Firm* — Fujitsu Patent Center

(57) ABSTRACT

A blockchain method generates data on a new blockchain by linking a new block to data on a blockchain including a plurality of blocks linked together each being a set of data containing given information. The blockchain method may further includes: in generating a second block following a first block included in the data on the blockchain, identifying, among branch blocks approved prior to the generating of the second block, one or more blocks capable of being approved in parallel with the first block, and generating and registering, in a memory, the second block following the first block and the one or more blocks capable of being approved in parallel with the first block.

8 Claims, 14 Drawing Sheets

(56) References Cited

U.S. PATENT DOCUMENTS

2020/0313896 A1* 10/2020 Micali .................... H04L 63/12

OTHER PUBLICATIONS

Akihiro Fujihara, "Proposing Distributed Traffic Information System using Blockchain Technology", IEICE Technical Report, Japan, The Institute of Electronics, Information and Communication Engineers (IEICE), vol. 117, No. 460, pp. 291-296, Feb. 22, 2018 [with English Abstract]. cited in JP-OA mailed on Oct. 19, 2021 for corresponding Japanese Patent Application No. 2018-063985.

* cited by examiner

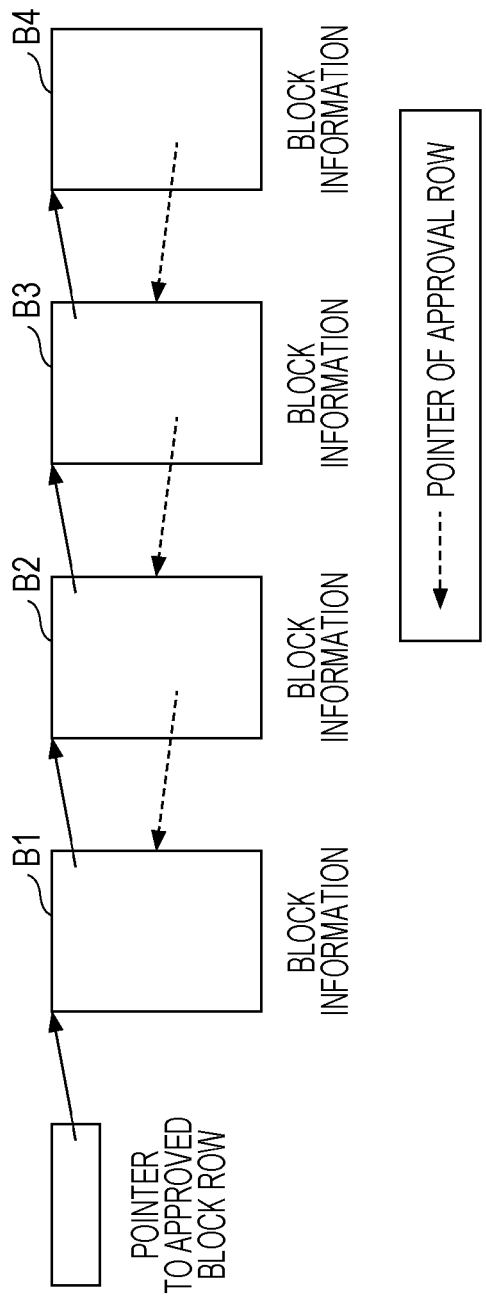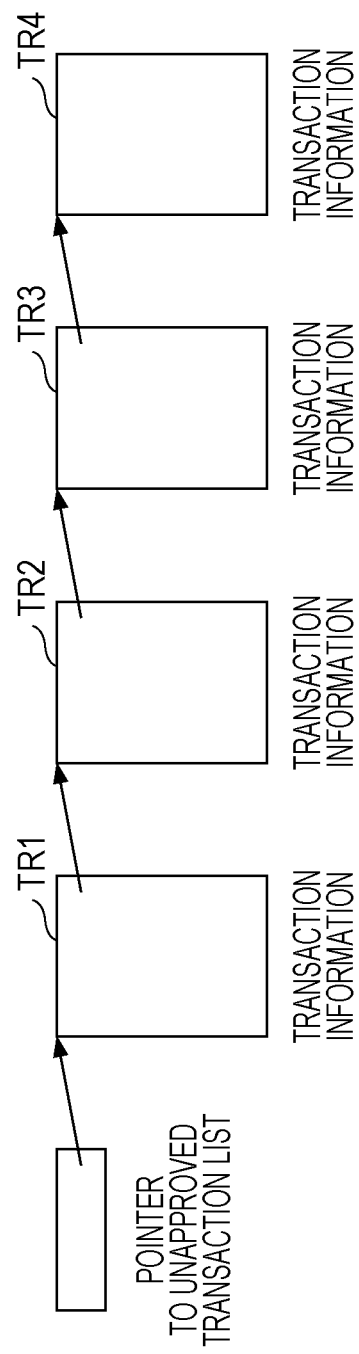

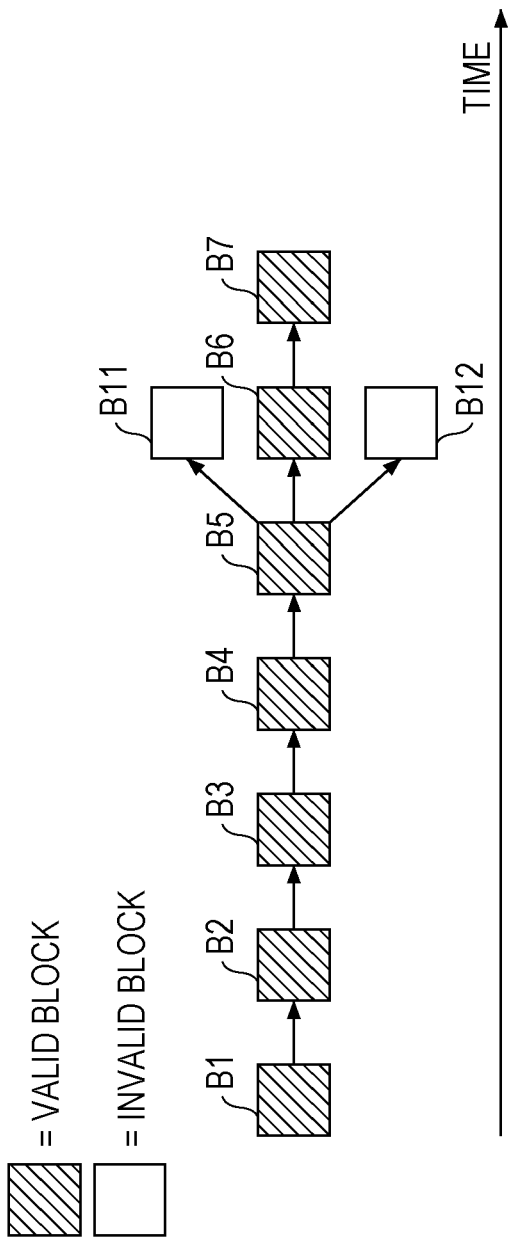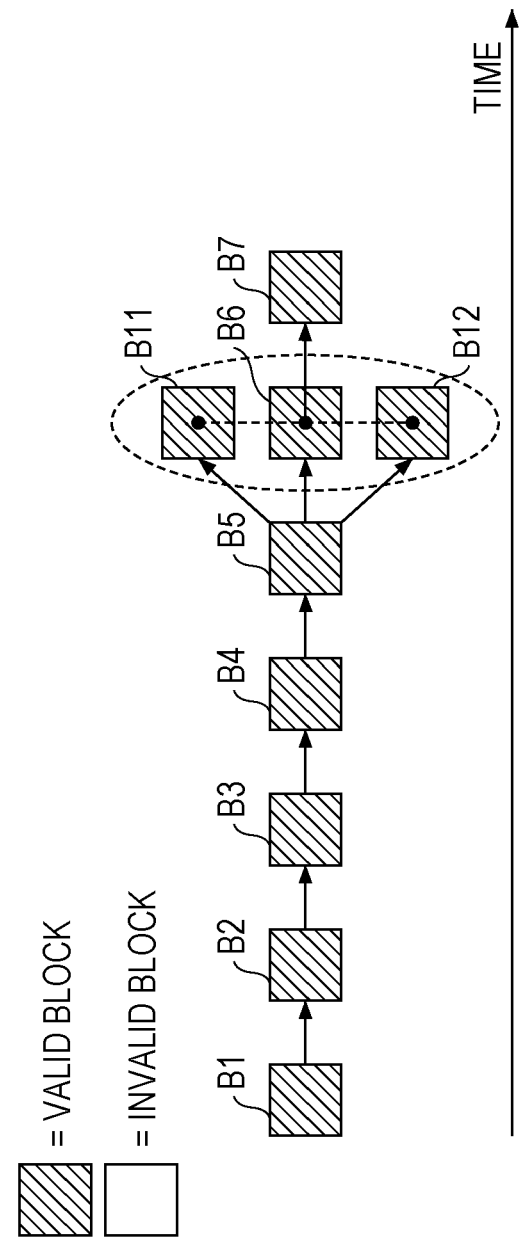

BLOCKCHAIN PROGRAM AND BLOCKCHAIN METHOD

CROSS-REFERENCE TO RELATED APPLICATION

This application is based upon and claims the benefit of priority of the prior Japanese Patent Application No. 2018-63985, filed on Mar. 29, 2018, the entire contents of which are incorporated herein by reference.

FIELD

The embodiments discussed herein are related to a blockchain program and a blockchain method.

BACKGROUND

In transaction deals using a virtual currency such as Bitcoin (registered trademark), a technology called blockchain is used (for example, refer to International Publication No. WO 2017/082238). Such a virtual currency unit may be referred to as a coin hereinafter. A blockchain is a linked list of blocks, each of which is generated in such a way that a certain number of pieces of transaction information of a virtual currency between participants are bundled together. Approval of transaction information in blockchain technology refers to generating a new block in a manner containing the transaction information.

With regard to a blockchain, a compute node that has generated a block that becomes finally valid is rewarded. Accordingly, nodes around the world compete with one another concurrently and speculatively in generating blocks, and therefore multiple blocks branch off from a single block in some cases.

There is a method that validates only blocks lying on a branch that has finally grown longest and invalidates all the blocks lying on the other branches. However, in this method, consumption of CPU resources used for generating blocks other than blocks on the longest branch results in unnecessary consumption. Increased consumption of the CPU resources used for generating invalid blocks means that transaction performance is degraded compared with the case where such increased consumption does not occur.

Accordingly, one aspect of the embodiments is directed to decreasing the number of blocks that are invalid in a blockchain.

SUMMARY

According to an aspect of the embodiments, a blockchain method generates data on a new blockchain by linking a new block to data on a blockchain including a plurality of blocks linked together each being a set of data containing given information. The blockchain method further includes: in generating a second block following a first block included in the data on the blockchain, identifying, among branch blocks approved prior to the generating of the second block, one or more blocks capable of being approved in parallel with the first block, and generating and registering, in a memory, the second block following the first block and the one or more blocks capable of being approved in parallel with the first block.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9A and FIG. 9B illustrate examples of data structures of an approved block row and unapproved transactions, according to an embodiment;

FIG. 13A and FIG. 13B are diagrams illustrating examples of results of a parallel approval process, according to an embodiment.

DESCRIPTION OF EMBODIMENTS

Figure 1:
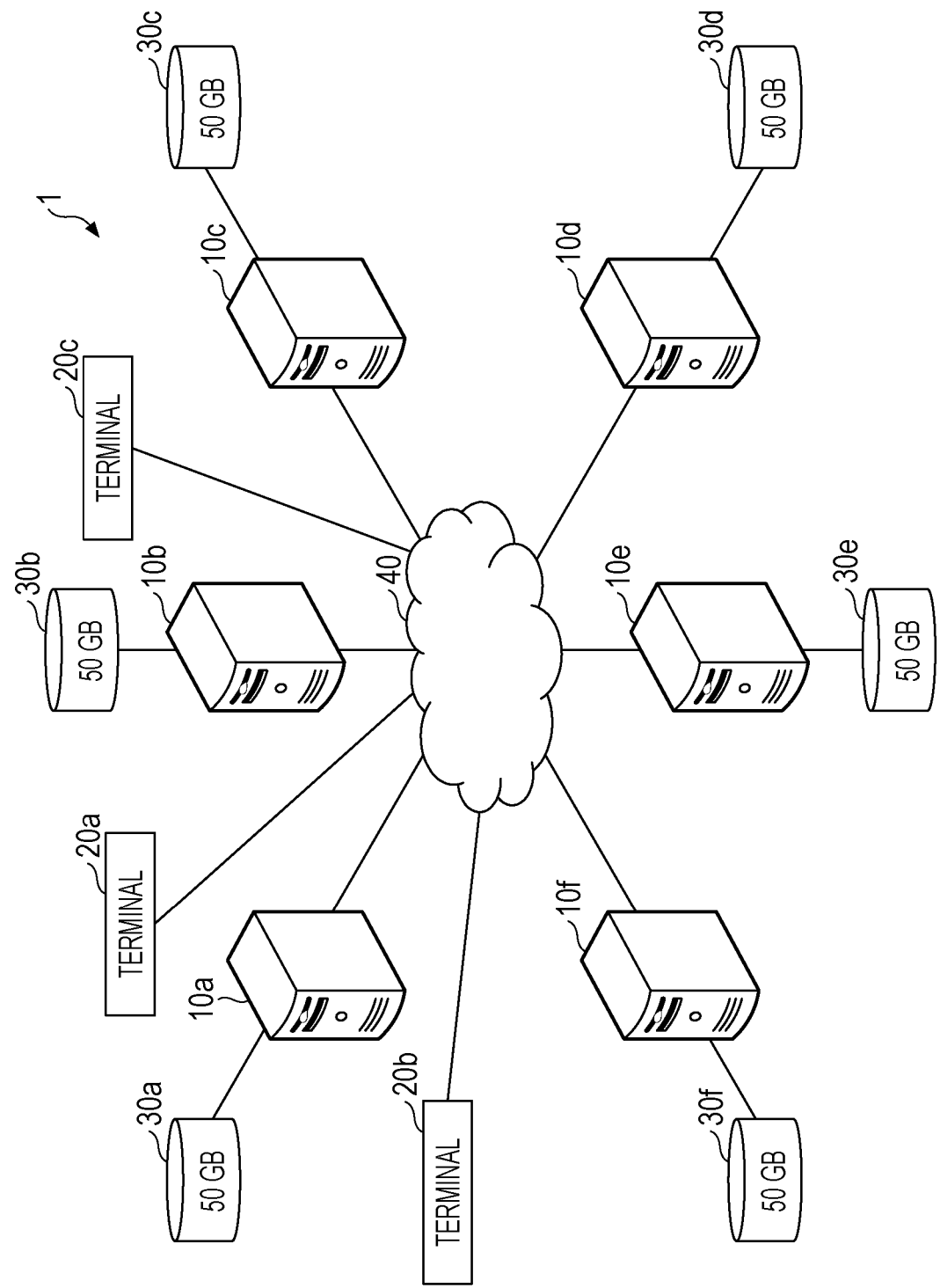
FIG. 1 is a diagram illustrating an example of a configuration of a transaction system, according to an embodiment.

Hereinafter, embodiments will be described with reference to the accompanying drawings. Herein and in the accompanying drawings, elements having substantially the same functional configuration are denoted by the same reference numerals and redundant descriptions thereof are omitted.

First, an example of a configuration of a transaction system 1 according to an embodiment will be described with reference to FIG. 1. FIG. 1 illustrates an example of a configuration of the transaction system 1 according to the present embodiment. The transaction system 1 according to the present embodiment includes blockchain generating devices 10a to 10f and terminals 20a to 20c. The blockchain generating devices 10a to 10f and the terminals 20a to 20c are connected via a peer to peer (P2P) network 40. However, the configuration of the transaction system 1 illustrated in FIG. 1 is an example, and the numbers of the generating devices 10 and the terminals 20 included in the transaction system 1 are not limited to the numbers illustrated in FIG. 1.

The blockchain generating devices 10a to 10f are compute nodes that generate blocks and are also called minors. In the present embodiment, the blockchain generating devices 10a to 10f are generically referred to as generating devices 10.

The generating device 10 may be any information processing apparatus such as a server or a personal computer (PC).

The terminals 20a to 20c are devices of users who participate in transaction deals using virtual currency. The terminals 20a to 20c generate transactions for performing transaction deals, such as remittances, in response to operations of the users. The terminals 20a to 20c are also generically referred to as terminals 20.

The terminal 20 broadcasts the data on generated transactions for transaction deals. Transactions that are generated are able to be used for financial deals that are performed via the P2P network 40, such as remittances using virtual currency. The terminal 20 may be any computer among a smartphone, a PC, a tablet terminal, a wearable device, and so on.

The generating device 10 approves transactions broadcast by the terminals 20, bundles together a given number of approved transactions into blocks, and links a new generated block to a blockchain in which the blocks are linked together to generate data on a new blockchain. The new blocks include the data on transactions that have occurred after the existing blockchain was generated.

Figure 2:
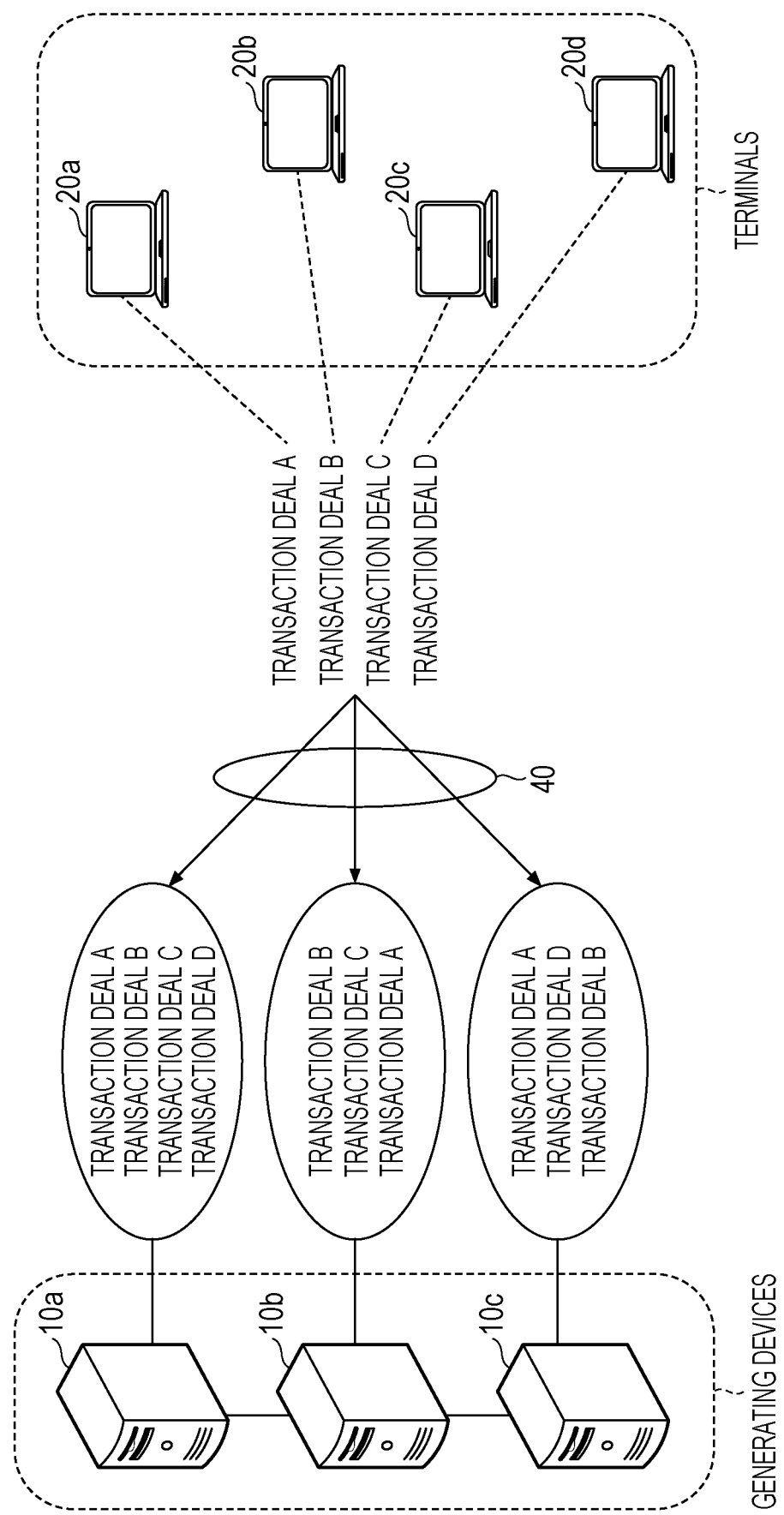
FIG. 2 is a diagram illustrating an example of transaction deals, according to an embodiment.

For example, in an example of transaction deals illustrated in FIG. 2, the terminals 20a to 20d generate transactions of transaction deals A to D, respectively. Data on transactions of the transaction deals A to D is broadcast via the P2P network 40 and is shared by a plurality of generating devices 10.

In the example illustrated in FIG. 2, the blockchain generating devices 10a to 10c generate blocks in which, out of the transactions of four new transaction deals A to D generated by the terminals 20a to 20d, the data on some or all of the transactions is bundled together. Collective approval of a certain number of transactions generated and bundling of the transactions into blocks, as performed by the generating device 10, may be referred to as mining. The term "approval" as used herein refers to taking data on a plurality of arbitrarily selected transactions into a block and calculating a hash value, thereby beginning to hold the data as data with protection against alteration from this point onward.

Referring back to FIG. 1, the data on a new blockchain generated by the generating device 10 is shared by the generating device 10 and the other generating devices 10 via the P2P network 40. The blockchain generating devices 10a to 10f are coupled to memory devices 30a to 30f, for example, of 50 GB in a one-by-one manner and may share data. Shared data that is stored in the memory devices 30a to 30f by the blockchain generating devices 10a to 10f includes approved transactions and unapproved transactions described hereinafter.

Transfer of Virtual Currency Value

Figure 3:
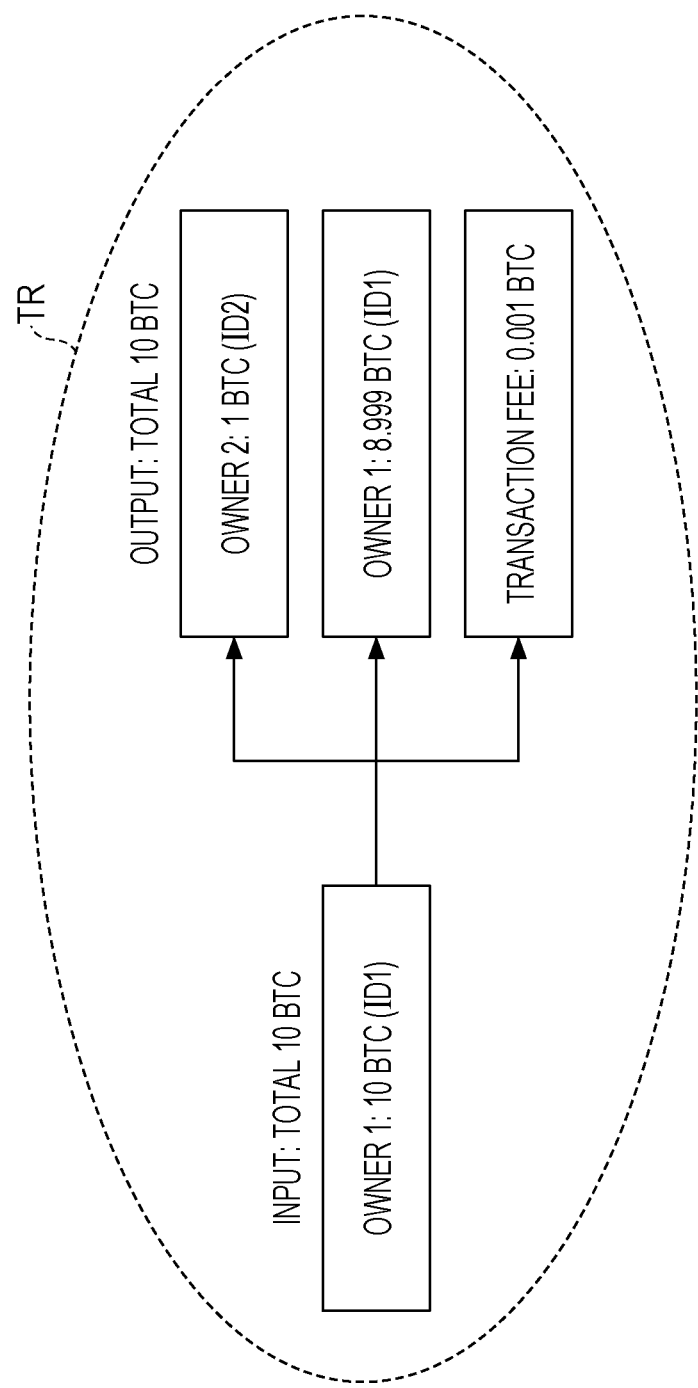
FIG. 3 is a diagram illustrating an example of transfer of a virtual currency value, according to an embodiment.

FIG. 3 illustrates an example of transfer of a virtual currency value. In the present embodiment, a transaction represents a record of transfer of a virtual currency value, that is, remittance and includes input information and output information.

In the input information, a mass of virtual currency (hereinafter referred to as a currency fragment) and a currency fragment identifier (ID) for identifying the currency fragment are included. For example, input information Input in FIG. 3 indicates that a user Owner 1, who performs a transaction deal, has deposited a currency fragment of 10 bitcoin (BTC).

The currency fragment ID, which is an example of identification information of a currency fragment, is included in data on a transaction. In the example in FIG. 3, a currency fragment of 10 BTC in input information is identifiable by a currency fragment ID ID1.

In output information Output, the amount of remittance (amount of virtual currency), a currency fragment yet to be used (unspent transaction output (UTXO)), and a transaction fee are included. Information such as a public key may be included in the output information. For the currency fragment in the input information, the currency fragment in the output information is divided into 1 BTC of a user Owner 2, 8.999 BTC of the user Owner 1, and 0.001 BTC of a transaction fee, which represents that a transaction deal has been made. The transaction fee is a virtual currency paid for each transaction by a user who has made the transaction deal.

In a single transaction, processing of remittance to one user is performed and remittance to a plurality of users is not permitted. In the example in FIG. 3, with the transaction TR, a currency fragment of 1 BTC is remitted to one user Owner 2. At this point, it is possible to generate another transaction TR from an unused currency fragment of 8.9999 BTC of the user Owner 1 and remit this currency fragment to another user.

Transactions

Figure 4:
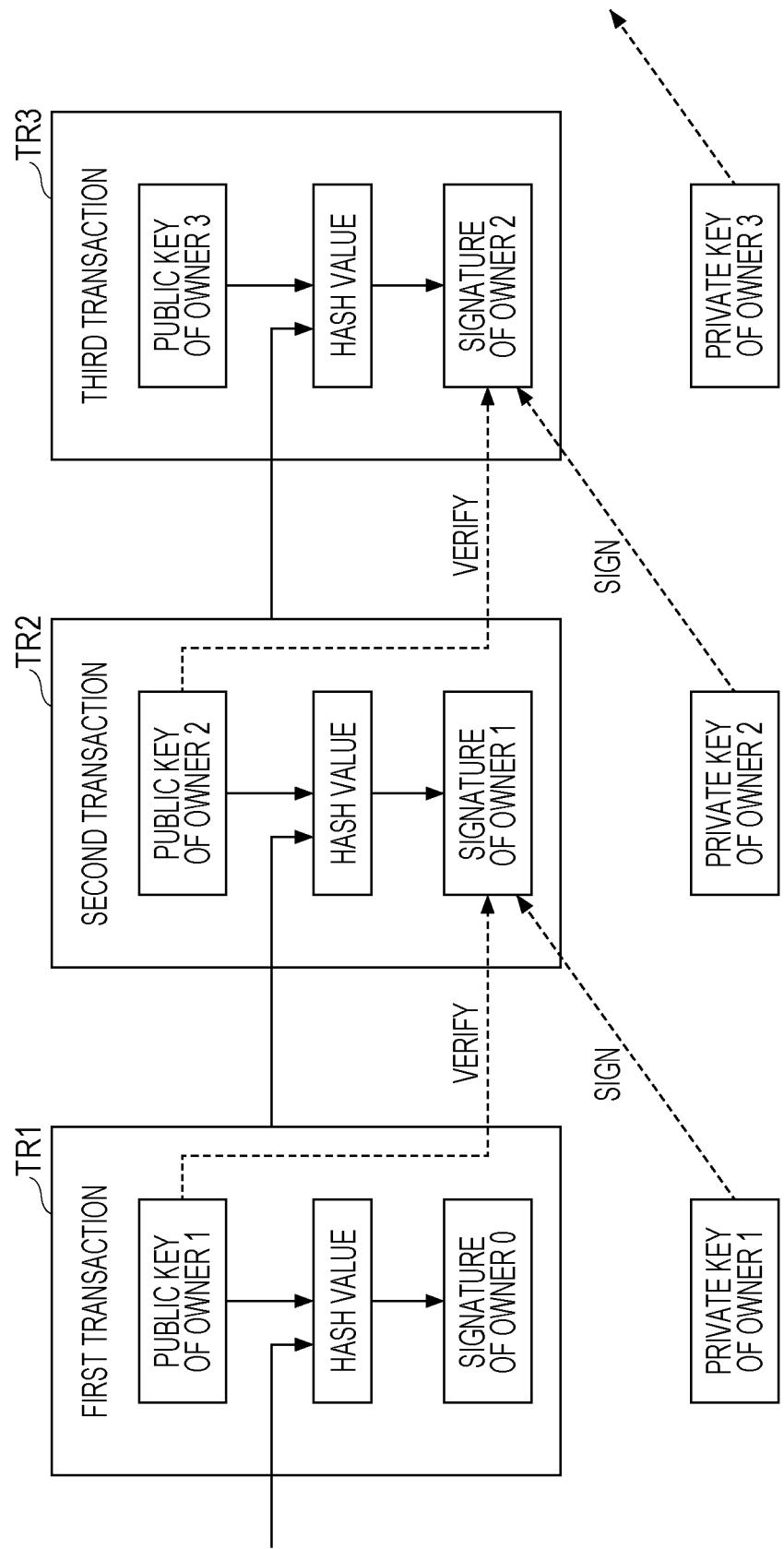
FIG. 4 is a diagram illustrating signatures in virtual currencies.

Next, with reference to FIG. 4, a signature in virtual currency will be described. For example, the first transaction TR1 is assumed as a process in which the terminal 20 of a user Owner 0 generates a transaction and makes remittance to the terminal 20 of the user Owner 1, and the terminal 20 of the user Owner 1 receives the remittance. A second transaction TR2 is assumed as a process in which the terminal 20 of the user Owner 1 generates a transaction and makes remittance to the terminal 20 of the user Owner 2, and the terminal 20 of the user Owner 2 receives the remittance.

The terminal 20 that generates the second transaction TR2 applies a cryptographic hash function to data in which data on the latest transaction (for example, the first transaction TR1) and a public key of the user Owner 1 are combined together, and adds a signature by using the private key of the user Owner 1. Thereby, the terminal 20 generates data on the second transaction TR2.

The terminal 20 of the user Owner 2, who receives a coin, verifies the signature of the second transaction TR2 by using the public key of the receiver, Owner 1, in the immediately preceding transaction deal, the first transaction TR1, and recalculates a hash value. Thereby, the terminal 20 of the user Owner 2 ascertains that the coin is passed from a legitimate owner. Data on each transaction includes content of the transaction, such as the value of a currency fragment used for the transaction deal, and an address corresponding to the public key of a user who generates the transaction.

Collecting Transactions to Generate Block

Figure 5:
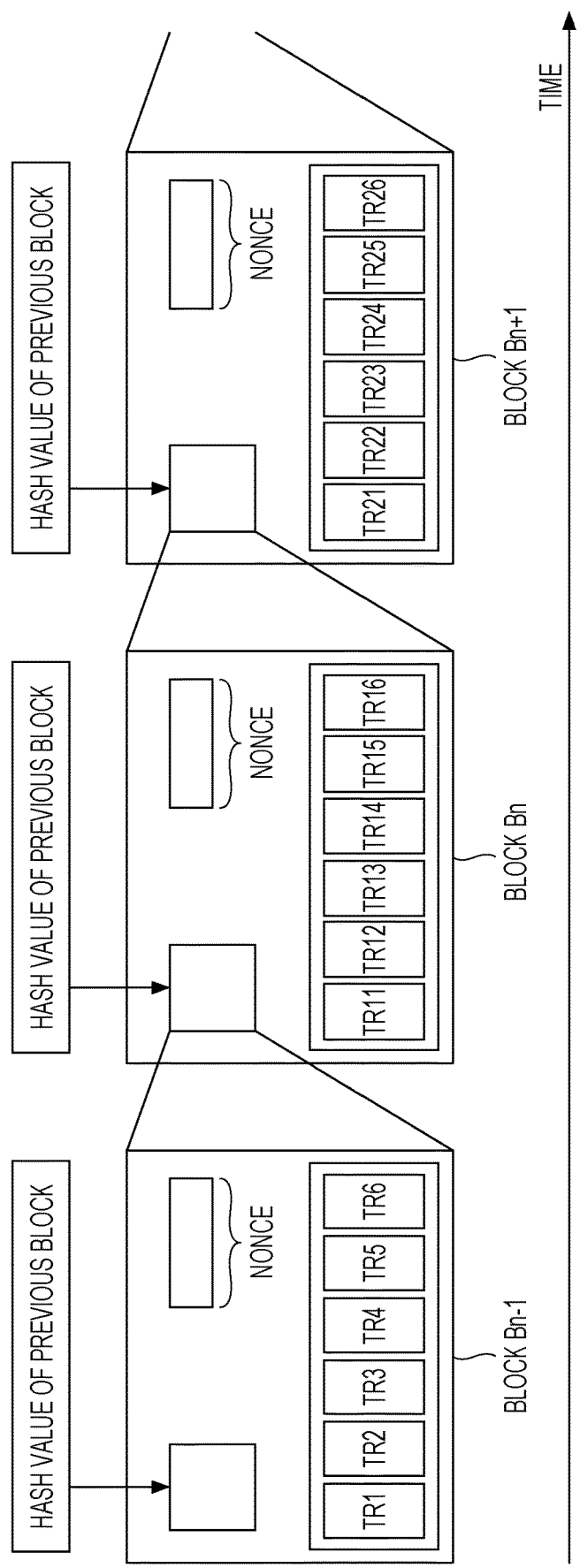
FIG. 5 is a diagram illustrating a blockchain in virtual currencies.

Data on a plurality of transactions generated is, under given conditions, collected into a block as illustrated in FIG. 5 and the block is linked to an existing blockchain by the generating device 10. At this point, in generating a new block, for example, a Bn+1 block in FIG. 5, the generating device 10 collects data on transactions that are not included in the blockchain. The generating device 10 incorporates data on collected transactions, for example, TR21 to TR 26 in FIG. 5 and a hash value of 256 bits of the last block Bn of the current blockchain into the new block Bn+1. In the hash value calculation, the condition in which when a cryptographic hash function is applied to the block Bn+1 that is being currently generated, the first k bits of bits of the obtained hash value are all to be zero is to be satisfied. For example, the generating device 10 searches for a value held in a nonce area in a round-robin way. As a result of search, it is assumed that the generating device 10 found an appropriate value, that is, a value that satisfies the condition for a hash value, for example, such as 000003F3B9A7 . . . , to be included in the block Bn+1 that is being currently generated by the generating device 10. Then, the generating device 10 links the block Bn+1 including the appropriate value to the last block Bn of the current blockchain to perform broadcast. Recalculation of a hash value is required for alteration of the generated block, and thus the resistance to alteration of a block may be enhanced.

Blockchain

Figure 6:
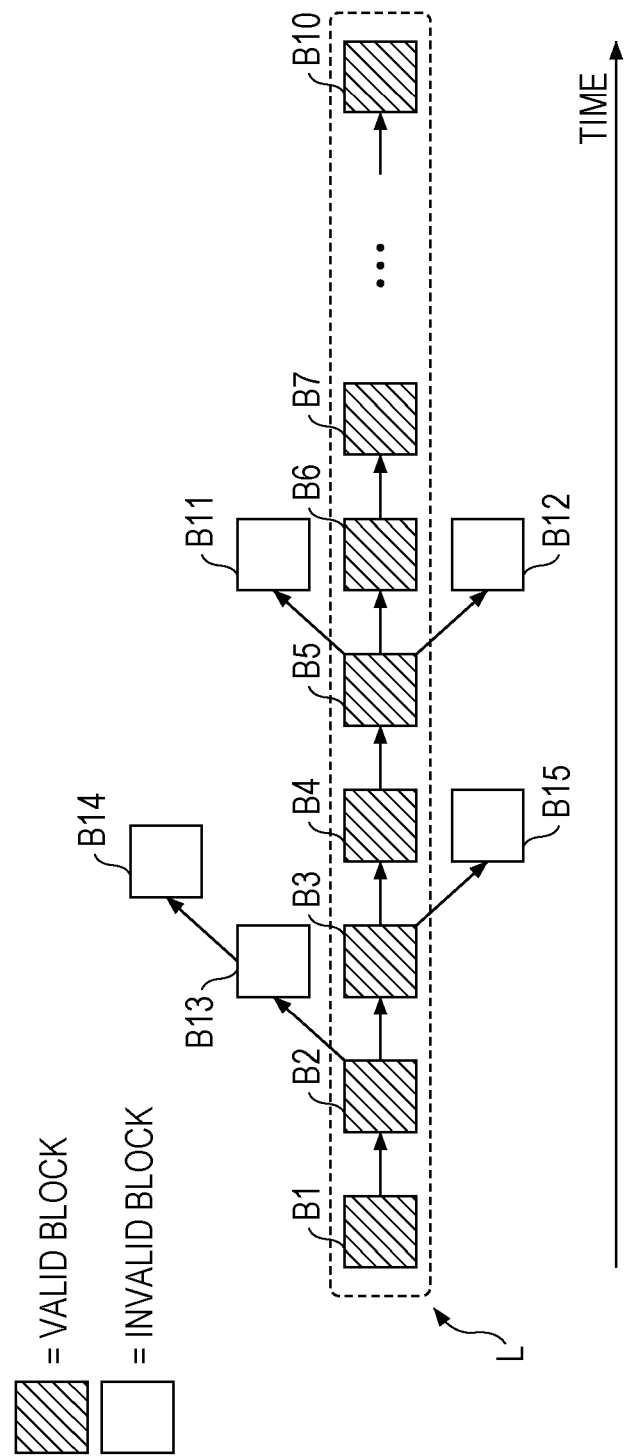
FIG. 6 is a diagram illustrating an example of a blockchain, according to an embodiment.

An example of a generated blockchain is illustrated in FIG. 6. A blockchain has a tree structure in which blocks B1 to B15 generated by the generating devices 10 are linked together. Each block is able to be linked to other blocks that have been approved before generation of the block. The generating devices 10 each try to concurrently and speculatively generate blocks to extend a blockchain, and therefore branching occurs.

As one of consensus schemes regarding costs provided by users who participate in transaction deals during generation of blocks, a method called proof of work (PoW) is proposed. In this method, in a blockchain, only blocks in the longest chain are made valid and all the other blocks on the branches are made invalid.

That is, among branch blocks, blocks contained in a chain whose length from the root-end block to the top-end block is longest are valid and the other blocks are invalid. For example, in the example in FIG. 6, the blocks B1 to B10 of the longest chain L are valid and the blocks B11 to B15 are invalid.

As a result, for the invalid blocks, the entire transaction system 1 has consumed the CPU resources inefficiently. In addition, the costs spent in generating blocks may be a bottleneck factor for the transaction performance of the entire transaction system 1, that is, the number of transactions capable of being processed per unit time.

The main cost spent in generating blocks is the consumption of CPU resources during hash calculation. Therefore, if it takes a long time to complete hash calculation, the transaction performance decreases, and the performance of the entire system decreases. In addition, when the generating device 10 generates an invalid block, the generating device 10 will not be able to obtain the reward, and therefore an increased number of invalid blocks makes it difficult for incentives for generating blocks to work.

Accordingly, in a blockchain method according to an embodiment described hereinbelow, a plurality of branch blocks are able to be collectively approved. This decreases invalid blocks and increases the number of blocks generated per unit time, improving the transaction performance. The probability that blocks considered to be speculatively generated will be effectively used increases, which enables inefficient consumption of CPU resources to decrease, enabling incentives for generating blocks to be provided to the generating device 10. The configuration and operations of the generating device 10 will be described hereinafter.

Functional Configuration

Figure 7:
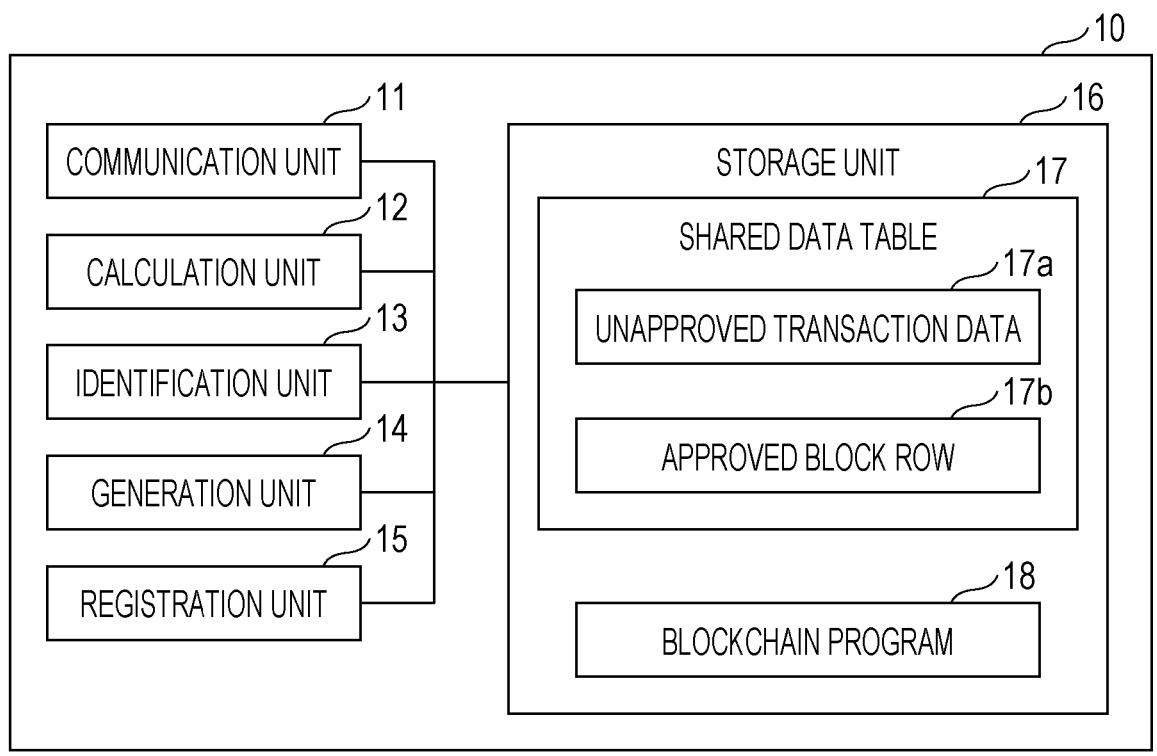
FIG. 7 is a diagram illustrating an example of a functional configuration of a blockchain generating device, according to an embodiment.

First, an example of a functional configuration of the generating device 10 according to an embodiment will be described with reference to FIG. 7. FIG. 7 is a diagram illustrating an example of a functional configuration of the generating device 10 according to an embodiment.

The generating device 10 according to an embodiment includes a communication unit 11, a calculation unit 12, an identification unit 13, a generation unit 14, a registration unit 15, and a storage unit 16. The storage unit 16 stores therein a shared data table 17 and a blockchain program 18. The shared data table 17 stores therein unapproved transaction data 17a and an approved block row 17b.

The communication unit 11 communicates with the generating devices 10, the terminals 20, and other computers, which are connected to the P2P network 40.

The calculation unit 12 calculates a hash value for use in generating a block, which is a set of data on transactions.

In generating a block (hereinafter also referred to as a second block) following one block (hereinafter also referred to as a first block) included in data on a blockchain, the identification unit 13 identifies, among branch blocks approved prior to generation of the second block, one or more blocks capable of being approved in parallel with the first block. The branching of blocks as used herein refers to two or more blocks diverging from one block out of blocks linked together.

The identification unit 13 determines whether, in a set of all combinations of branch blocks in a blockchain, transactions that have the same identification information of a currency fragment in the input information of the transactions are present in different blocks included in a combination. If it is determined that transactions that have the same identification information of a currency fragment in the input information of the transactions are present in different blocks included in a combination, the identifying unit 13 determines that there is a dependence between transactions included in the different blocks, and excludes the blocks included in the combination. The identification unit 13 identifies blocks included in combinations other than the combination including the excluded blocks, as blocks capable of being approved in parallel with the first block.

The identification unit 13 excludes the combination of blocks in which there is a dependence between the transactions, and identifies blocks included in combinations that are not excluded as blocks capable of being approved in parallel with the first block.

The identification unit 13 may identify, out of blocks that are branch blocks and that are linked from a block preceding the first block, one or more blocks capable of being approved in parallel with the first block.

The generating unit 14 links a new block to the data on a blockchain to generate data on a new blockchain.

The registration unit 15 generates and registers the second block that follows the first block and one or more blocks identified as being capable of being approved in parallel with the first block.

The calculation unit 12 adds the number of the first block and the identified blocks capable of being approved in parallel with the first block to the length of the block row of a blockchain. The calculation unit 12 also calculates a reward for generating and registering the second block, in accordance with the length of the block row.

The unapproved transaction data 17a in the shared data table 17 stored in the storage unit 16 is a set of data on unapproved transactions yet to be bundled into blocks. The approved block row 17b is a row of blocks obtained by approving unapproved transactions of the unapproved transaction data 17a, bundling the approved transactions into blocks, and linking the blocks together. The unapproved transaction data 17a and the approved block row 17b constitute an example of shared data that is broadcast and is shared by all the generating devices 10.

The blockchain program 18 is a program for performing a process of bundling a plurality of unapproved transactions to generate blocks and a process of identifying blocks capable of being approved in parallel.

Hardware Configuration

Figure 8:
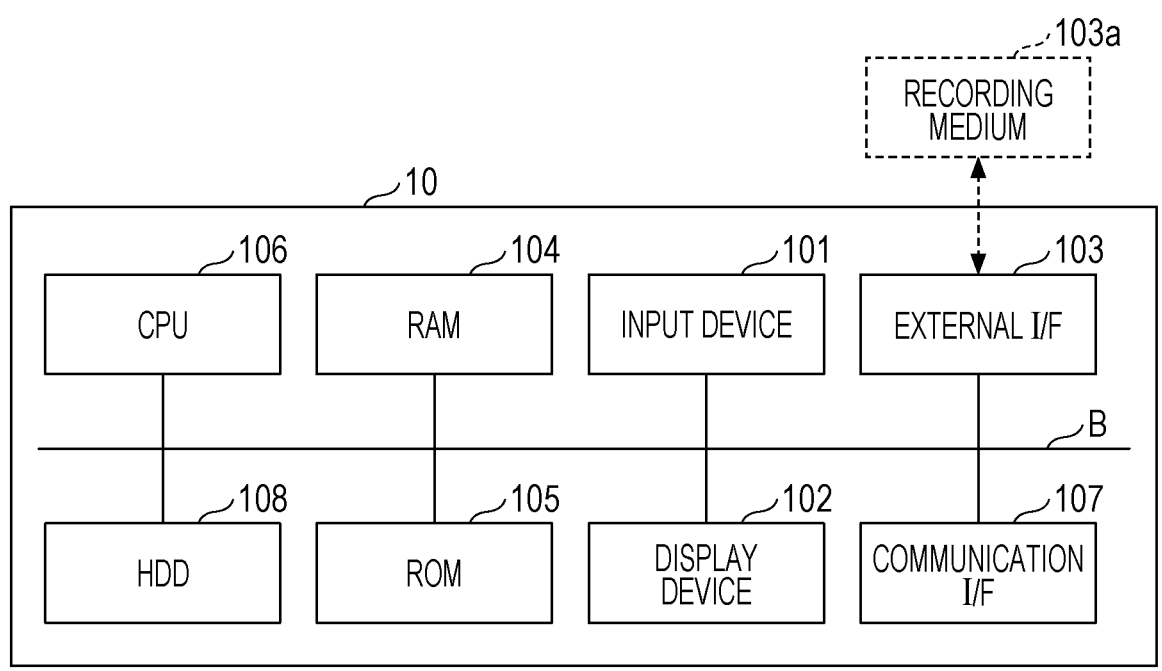
FIG. 8 is a diagram illustrating an example of a hardware configuration of a blockchain generating device, according to an embodiment.

Next, an example of a hardware configuration of the generating device 10 according to an embodiment will be described with reference to FIG. 8. FIG. 8 is a diagram illustrating an example of a hardware configuration of the generating device 10 according to an embodiment.

The generating device 10 includes an input device 101, a display device 102, an external interface (I/F) 103, a random access memory (RAM) 104, a read-only memory (ROM) 105, a central processing unit (CPU) 106, a communication I/F 107, and a hard disk drive (HDD) 108, which are coupled to each other by a bus B.

The input device 101 includes a keyboard, a mouse, or the like and is used for inputting each operating signal to the generating device 10. The display device 102 includes a display, such as a liquid crystal display (LCD) monitor, a printer, a cathode ray tube (CRT), and so on and displays various processing results.

The communication I/F 107 is an interface that connects the generating device 10 to the P2P network 40. Thereby, the generating device 10 communicates data on transactions and data on a blockchain with the terminals 20 of users and the other generating devices 10 via the communication I/F 107.

The HDD 108 is a nonvolatile storage device in which programs and data are stored. Examples of the programs and data that are stored therein include software that controls the entirety of the generating devices 10 and application software. For example, in the HDD 108, the shared data table 17 and the blockchain program 18 may be stored.

The external I/F 103 is an interface with external devices. Examples of the external device include a recording medium 103a and so on. Thus, the generating device 10 is able to perform reading from and/or writing to the recoding medium 103a via the external I/F 103. Examples of the recoding medium 103a include a compact disk (CD) and a digital versatile disk (DVD), a secure digital (SD) memory card and a universal serial bus (USB) memory, and so on.

The ROM 105 is a nonvolatile semiconductor memory capable of holding internal data when the power is turned off. In the ROM 105, programs and data for network setting and the like are stored. The RAM 104 is a volatile semiconductor memory that temporarily holds programs and data. The CPU 106 is an arithmetic operation unit that reads programs and data from storage devices, such as the HDD 108 and the ROM 105, onto the RAM 104 and performs processing so as to achieve control over the entire devices and mounting functions.

FIG. 7 is a block diagram with attention paid to functions, and a processor that executes software of units illustrated as the functional blocks is hardware. For example, the functions of the calculation unit 12, the identification unit 13, the generation unit 14 and the registration unit 15 are implemented by a blockchain process and a parallel approval process that the blockchain programs 18 causes the CPU 106 to execute.

The function of the communication unit 11 may be achieved, for example, by the communication I/F 107. The function of the storage unit 16 may be achieved, for example, by the RAM 104, the ROM 105, and the HDD 108. The unapproved transaction data 17a and the approved block row 17b stored in the shared data table 17 may be stored in the RAM 104, the HDD 108, or a server or the like on a cloud connected via the P2P network 40 to the generating device 10.

Data Structures of Approved Block Row and Unapproved Transactions

An example of the approved block row 17b is illustrated in FIG. 9A. Blocks B1, B2, B3, B4 . . . of the approved block row 17b are linked by pointers, and block information (transaction information included in a block, or the like) on all the blocks is managed.

The pointers indicated by solid lines are pointers for managing block information on all the blocks and are not related to the order in which the blocks are generated. In contrast, pointers indicated by dotted lines represent the order in which the blocks are generated. As described hereinabove, approval in a blockchain refers to generation of a new block, and a pointer of an approval row indicates which of a plurality of blocks already created at this point the new block is linked to. The pointer of the approval row, which is in a direction opposite to the direction of the solid-line pointer, indicates which of the blocks the new block is linked to. In the example in FIG. 9A, it is recognizable from the pointers of the approval row that at the time of generating the block B4, the block B4 is linked to the block B3, at the time of generating the block B3, the block B3 is linked to the block B2, and, at the time of generating the block B2, the block B2 is linked to the block B1.

An example of the unapproved transaction data 17a is illustrated in FIG. 9B. In the unapproved transaction data 17a, unapproved transactions that are yet to be bundled into a block are linked by pointers based on a list of unapproved transactions included in the shared data table 17. In the example in FIG. 9B, unapproved transactions TR1, TR2, TR3, TR4 . . . are linked by pointers, and information on all the unapproved transactions is managed.

Figure 10:
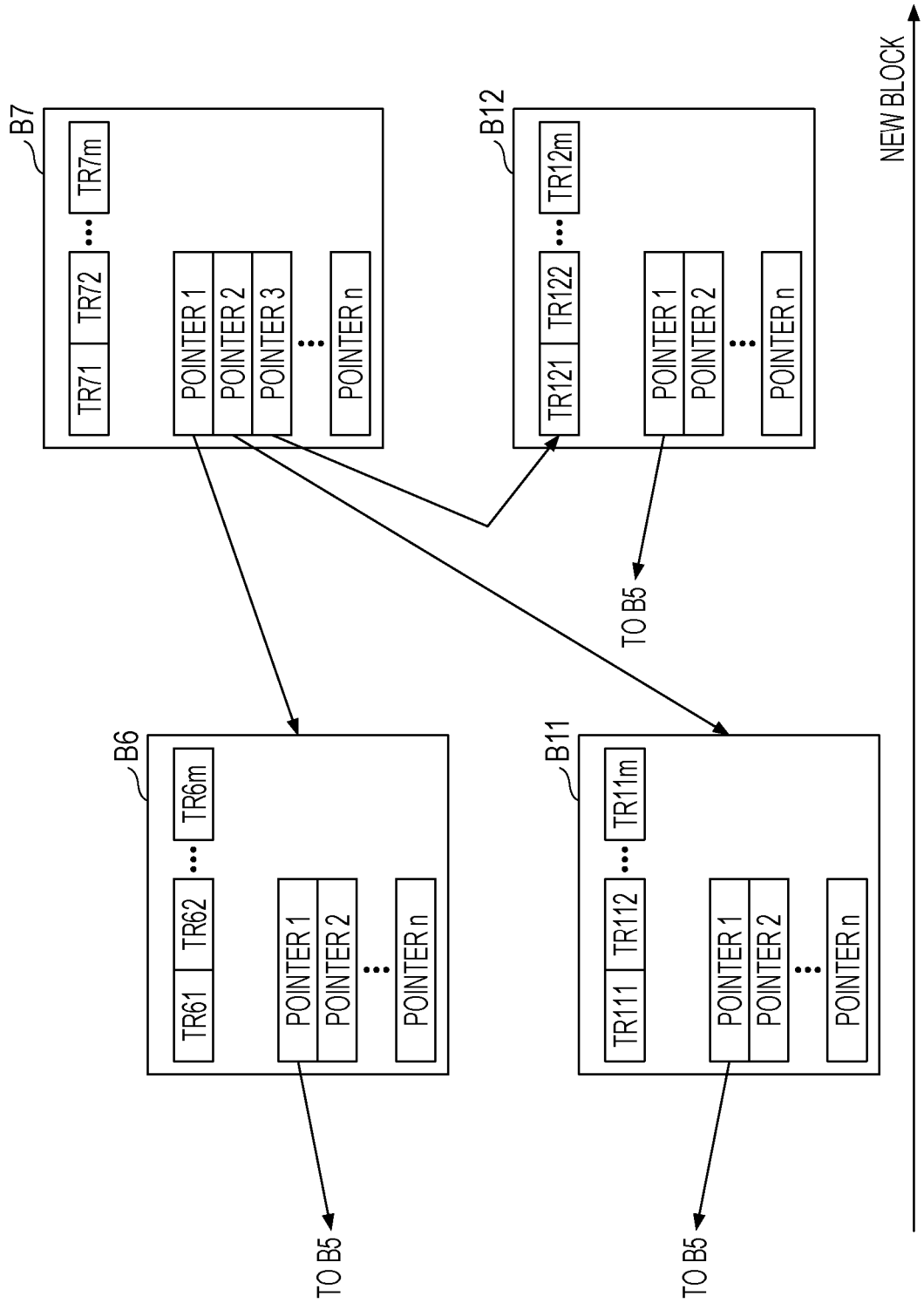
FIG. 10 is a diagram illustrating an example of a data structure in a block, according to an embodiment.

The data structure of the approved block row 17b will be further described with reference to FIG. 10. FIG. 10 illustrates an example of a data structure of the blocks B11, B6, and B12, which branch off from the block B5 illustrated in FIG. 6, and the block B7 linked to the block B6. The blocks linked in FIG. 10 represent part of the approved block row 17b.

A plural pieces of transaction information are stored in the blocks B6, B7, B11, and B12. For example, in the block B6, information on a transaction row (TR61, TR62 . . . TR6m) is stored. For the transaction row, only data in which the transaction deals of transactions are summarized may be stored in a block.

In each block, the areas for pointers corresponding to the number of parallel approvals of blocks permitted in advance are secured. Since parallel approval of blocks is not permitted in existing technologies, one area is secured for pointers indicating the linkage between blocks. In contrast, in the present embodiment, if given conditions are satisfied, parallel approval of blocks is permitted. Therefore, a plurality of areas are required for pointers indicating a linkage between blocks. For example, when the blocks B11 and B12 are approved in parallel with the block B6, information on the blocks B6, B11, and B12 is stored in pointers 1 to 3 in the block B7.

The unapproved transaction data 17a and the approved block row 17b of the data structures described above are stored in the storage units 16 of all the generating devices 10 connected to the P2P network 40 and are managed as shared data.

Figure 11:
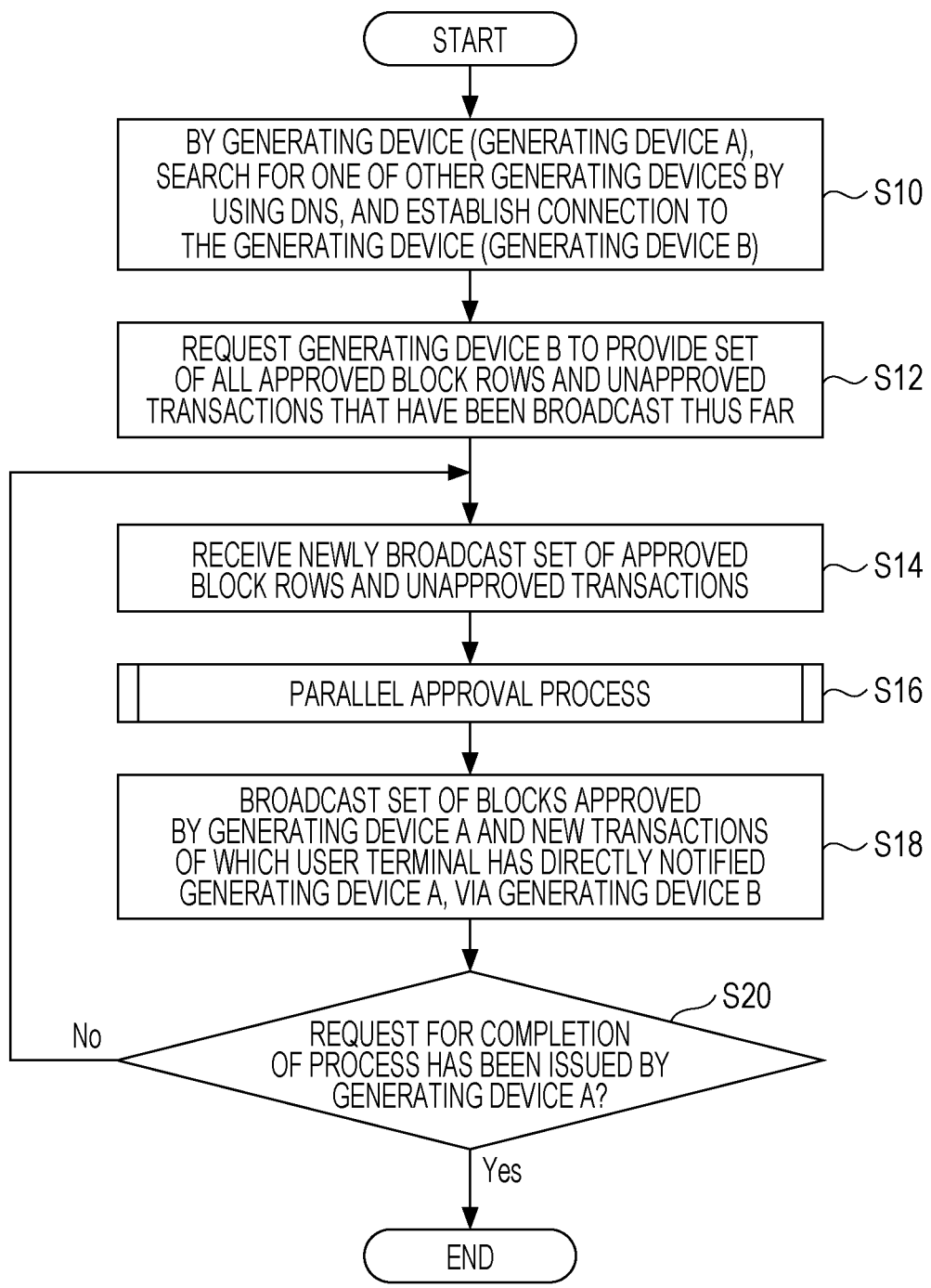
FIG. 11 is a flowchart illustrating an example of a blockchain process, according to an embodiment.
Figure 12:
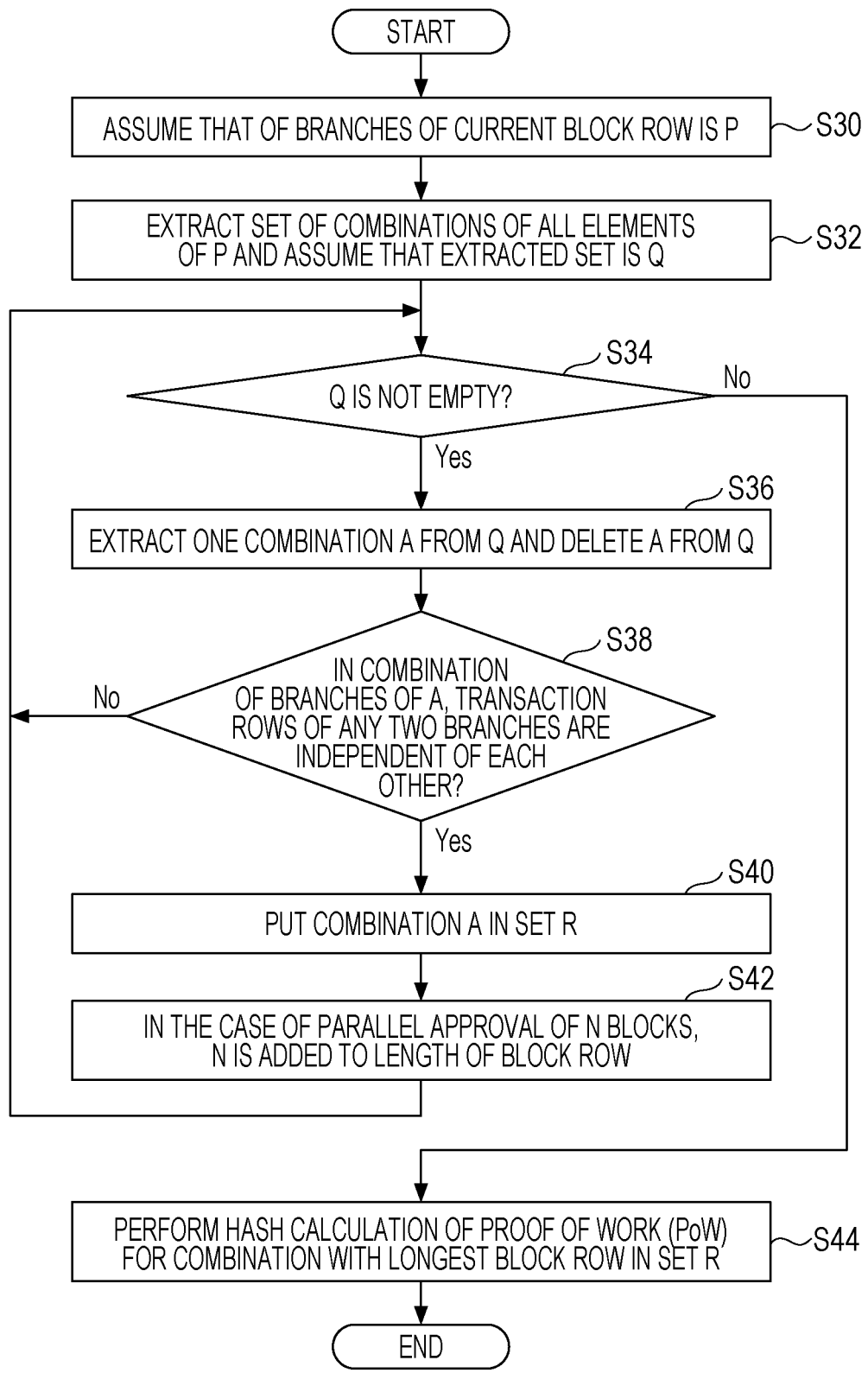
FIG. 12 is a flowchart illustrating an example of a parallel approval process, according to an embodiment.

Next, the blockchain process, which include determining a timing at which the unapproved transaction data 17a and the approved block row 17b are to be transmitted from one generating device 10 to another generating device 10, and the parallel approval process will be described with reference to FIG. 11 and FIG. 12. FIG. 11 is a flowchart illustrating an example of a blockchain process according to an embodiment. FIG. 12 is a flowchart illustrating an example of a parallel approval process according to an embodiment.

Blockchain Process

The present process is performed in each generating device 10. For explanatory convenience, description will be given assuming that the generating device 10 that performs the present process is a generating device A; however, each of all the generating devices 10 may be the generating device A. For explanatory convenience, description will be given assuming that one generating device 10 other than the generating device 10 that performs the present process is a generating device B.

When, following an instruction of an administrator of the generating device A, the generating device A activates the blockchain process, the present process begins. The communication unit 11 of the generating device A searches for one of the other generating devices 10 by using a domain name system (DNS), and establishes connection to the generating device 10 (the generating device B) searched for (step S10).

Next, the communication unit 11 requests the generating device B to provide all of the approved block rows and unapproved transaction data that have been broadcast thus far (step S12). The communication unit 11 receives, as a response to the request, a set of approved block rows and unapproved transaction data that have been newly broadcast (step S14). The storage unit 16 stores the received set of approved block rows and unapproved transaction data in the shared data table 17. Thereby, the generating device A stores therein the latest unapproved transaction data 17a and approved block row 17b. The generating unit 14 generates a block into which a given number of unapproved transactions included in the unapproved transaction data 17a are bundled.

Next, the identification unit 13 performs the parallel approval process (step S16). The parallel approval process is performed according to the flowchart illustrated in FIG. 12, so that one or more blocks capable of being approved in parallel with one block are identified. After the parallel approval process is performed, the communication unit 11 broadcasts a set of blocks generated by the generating device A and new transactions of which the terminal 20 has directly notified the generating device A, via the generating device B (step S18).

Next, the communication unit 11 determines whether the generating device A has issued a notification of a request for completion of the process, according to an instruction of the administrator of the generating device A (step S20). If the communication unit 11 determines that the generating device A has not issued a notification of a request for completion of the process, the communication unit 11 returns to step S14 and repeats steps S14 to S20. If the communication unit 11 determines that the generating device A has issued a notification of a request for completion of the process, the communication unit 11 terminates the present process.

Parallel Approval Process

The parallel approval process in FIG. 12 called in step S16 in FIG. 11 will be described. In the parallel approval process, the calculation unit 12 assumes that a set of branches in the current blockchain row (the approved block row 17b) is P (step S30). For example, in the approved block row illustrated in FIG. 13A, branch blocks B6, B7, B11, and B12 constitute the branch set P.

Next, the calculation unit 12 extracts a set of combinations of all of the elements of the branch set P and assumes that the set of combinations is Q (step S32). In the example in FIG. 13A, for the case of three pointers in each block, the combinations of Q are combinations of three elements. For example, combinations (B6, B7, B11), (B6, B7, B12), (B6, B11, B12), and (B7, B11, B12) are extracted.

Referring back to FIG. 12, next, the calculation unit 12 determines whether Q is empty (step S34). If it is determined that Q is empty, the calculation unit 12 proceeds to step S44. However, if it is determined that Q is not empty, the calculation unit 12 extracts one combination (called a combination A) and deletes the combination A from Q (step S36). For example, when, for example, (B6, B7, B11) is extracted as the combination A, the combination A is deleted from Q.

Next, the identification unit 13 determines whether transactions in any-two-branch blocks among blocks of the branch combination A are independent of each other (step S38). When (B6, B7, B11) is the combination A, (B6, B7), (B6, B11), and (B7, B11) are mentioned as any-two-branch blocks. The identification unit 13 determines whether transactions included in each pair of these any-two-branch blocks are independent of each other. However, this determination processing may not be performed for (B6, B7) that are valid at this point.

Whether transactions included in any-two-branch blocks are independent of each other is determined by whether transactions having the same identification information of a currency fragment in their input information are present in different blocks constituting the any-two-branch blocks. If transactions having the same identification information of a currency fragment in their input information are present in different blocks constituting the any-two-branch blocks, it may be determined that there is a dependence in terms of transaction deals between the pair of the any-two-branch blocks. Therefore, the identification unit 13 excludes the pair of the any-two-branch blocks from blocks capable of being approved in parallel, that is, the any-two-branch blocks are not incorporated into a set R, and the process returns to S34 and repeats step S34 and subsequent steps.

For example, in the case where any-two-branch blocks are (B6, B11), when the identification information of a currency fragment in the input information of a transaction included in the block B6 matches the identification information of a currency fragment in the input information of a transaction included in the block B11, the pair of the blocks of (B6, B11) are not incorporated into the set R and the process returns to step S34.

However, if, in step S38, it is determined that transactions in any-two-branch blocks among blocks of the branch combination A are independent of each other, the identification unit 13 determines that the any-two-branch blocks are capable of being approved in parallel and incorporates the any-two-branch blocks into the set R (step S40).

Next, when blocks capable of being approved in parallel are n blocks, the identification unit 13 adds n to the length of the block row of the blockchain (step S42). For example, as illustrated in FIG. 13B, in the case where (B6, B11) and (B6, B12) are blocks capable of being approved in parallel, n=3 (three, the blocks B6, B11, and B12) is added to the length of the block row of the blockchain.

Steps S34 to S42 are repeated until Q becomes empty, and, when Q has become empty, in step S44, the calculation unit 12 performs hash calculation of PoW for a combination having the longest length of approved block row in the set R, and completes the present process.

According to the present process, it is determined whether a dependence is included in one combination, A, among the set Q of combinations of branch blocks, that is, whether blocks in the combination A are independent of each other, and, if blocks are independent of each other, the combination including the blocks is determined to be capable of being approved in parallel and thus the combination A including the blocks is incorporated into the set R. If a dependence is included in blocks of the combination A, the blocks are determined to be incapable of being approved in parallel and thus the combination A including the blocks is kept out of the set R.

The set R is a set of blocks that are approved (including parallel approval) at a time. The larger the total number of blocks approved at a time, the smaller the number of invalid blocks and the better the efficiency of CPU resource utilization when blocks are approved at a time. Accordingly, a combination of blocks the total number of which is largest is extracted from the set R, and a hash calculation of PoW is performed for the blocks of the extracted combination. Thus, a parallel approval process is performed.

For example, if it is determined that there is no dependence between transactions included in (B6, B11) and (B6, B12), the combinations (B6, B11) and (B6, B12) are incorporated into the set R. Thereby, it is determined that parallel approvals between the block B6 and the blocks B11 and B12 included in the set R are possible. In the example in FIG. 13B, in addition to the number of blocks B1 to B7, seven, the number of blocks B11 and B12, two, is added to the number of approved block row.

However, when although there is no dependence in the combination of (B6, B11), there is a dependence in the combination of (B7, B11), the block B11 is excluded from parallel approval. Likewise, when although there is no dependence in the combination of (B6, B12), there is a dependence in the combination of (B7, B12), the block B12 is excluded from parallel approval.

A combination of the largest total number of blocks is extracted from the set R, and a hash calculation of PoW is performed for the blocks of the extracted combination, such that, as illustrated in FIG. 13B, parallel approvals of the block B6 and the blocks B11 and B12 are achieved.

During hash calculation of PoW, a plurality of blocks are convolved, for example, by light-weight calculation such as exclusive or (XOR) and a hash value may be calculated for the result. Thereby, the computational complexity of the hash calculation may be reduced.

Hereinabove, description has been given of a blockchain method according to an embodiment in which a new block is linked to data on a blockchain in which blocks, which are sets of transaction data including given information (for example, transaction deal information), are linked together, such that data on a new blockchain is generated.

Figure 14A:
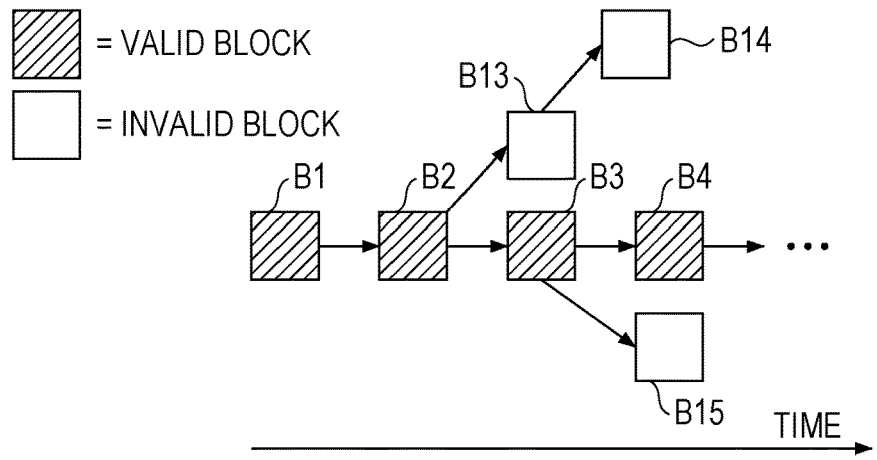
FIG. 14A, FIG. 14B, and FIG. 14C are diagrams illustrating examples of results of a parallel approval process, according to an embodiment.

For example, the block B6 in FIG. 13A and FIG. 13B is an example of the first block included in data on a blockchain, and the block B7 is an example of the second block following the first block. The block B3 in FIG. 14A is an example of the first block included in data on a blockchain, and the block B4 is an example of the second block following the first block.

According to the present blockchain method, in a set of branch blocks of a branching block, blocks in which there is no dependence between transactions are determined to be blocks capable of being approved in parallel. In an existing blockchain method, as illustrated in FIG. 13A, among branch blocks, blocks included in a chain whose length from the root-end block to the tip-end block is longest are valid and the other blocks are invalid. Therefore, as the number of invalid blocks increases, consumption of CPU resources in the entire transaction system becomes inefficient, which is a bottleneck factor for the transaction performance.

In contrast, in a blockchain method according to an embodiment as described hereinabove, a plurality of branch blocks may be collectively approved (parallel approval). For example, as illustrated in FIG. 13B, the blocks B11 and B12, which have been determined before to be invalid, may be determined as valid blocks.

Figure 14B:
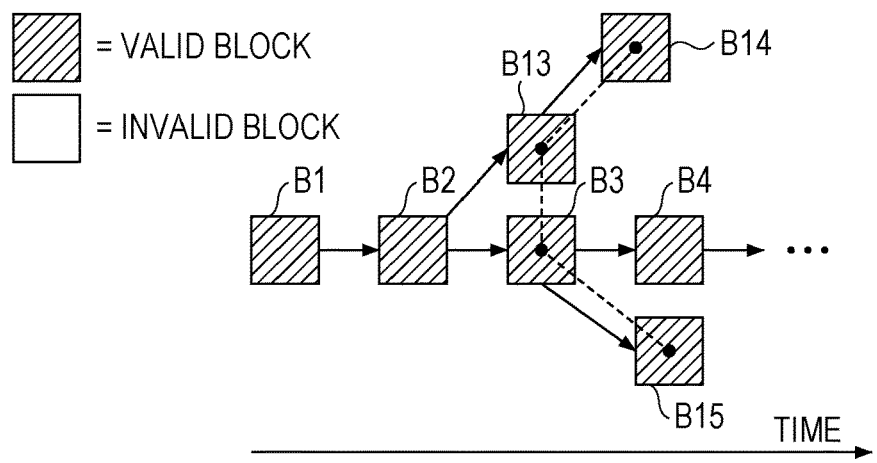

FIG. 14B illustrates an example in which it is determined whether there is a dependence between transactions included in a combination of any two blocks out of a set of branch blocks B3, B4, B13, B14, and B15, and it is determined that there is no dependence between transactions in all of the combinations of blocks. In this case, the blocks B13, B14, and B15 are determined as blocks that are approved in parallel with the block B3. Thereby, the blocks B13, B14, and B15, which have been determined before to be invalid as illustrated in FIG. 14A, may be determined as valid blocks.

Figure 14C:
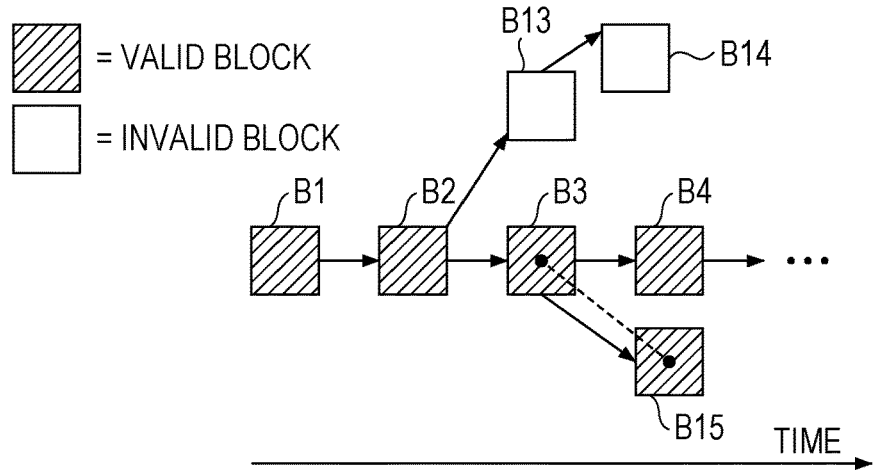

FIG. 14C illustrates an example in which it is determined whether there is a dependence between transactions included in a combination of any two blocks out of the set of branch blocks B3, B4, B13, B14, and B15, and it is determined that there is a dependence between transactions in a combination of the block B13 and the block B3 or in a combination of the block B13 and the block B4. If it is determined that there is no dependence in the other combinations of any two blocks, the block B13 and the block B14 linked to the block B13 by a pointer are excluded, and the block B15 is determined to be a block that is approved in parallel with the block B3. Thereby, the block B15, which has been determined before to be invalid, may be determined as a valid block.

Inclusion of attribute information representing an invalid block in the data structure of the block illustrated in FIG. 10 enables whether the block B13 and the block B14 linked to the block B13 by a pointer are valid or invalid to be determined by using the respective pieces of attribute information. In this case, the block B13 is excluded, and the block B14 and the block B15 are determined as blocks that are approved in parallel with the block B3. Thereby, the block B14 and the block B15, which have been determined before to be invalid, may be determined as valid blocks.

Thereby, since a plurality of blocks generated in parallel is collectively subjected to approval processing, the number of blocks generated per unit time increases. This may speed up the transaction performance of a blockchain. Since the number of blocks determined to be invalid decreases and therefore the probability that blocks will be effectively used increases, a more efficient consumption of CPU resources of a blockchain may be achieved.

The generating device 10 receives a fee of the user and a reward for generating blocks. Therefore, in the present embodiment, invalid blocks are more likely to decrease and a high reward is more likely to be obtained when blocks are approved in parallel than when blocks are not approved in parallel. For example, in a blockchain method in an embodiment, the length of the approved block row of a blockchain is calculated by adding the number of identified blocks capable of being approved in parallel with the first block. Then, in accordance with the number of identified blocks capable of being approved in parallel with the first block, a reward for generating and registering the second block linked to the first block is calculated.

That is, in a blockchain method according to the present embodiment, when blocks are approved in parallel, the length of a block row is evaluated to be longer than when blocks are not approved in parallel by an amount corresponding to the number of blocks approved in parallel, so that parallel approval occurs more often. Thereby, a reward for mining when blocks are approved in parallel may be made higher, so that collective approval is more likely to occur.

In a blockchain method in an embodiment, a block is a set of data containing given information, and data on transactions including IDs of currency fragments is included in the data containing given information. A block, which is a set of data containing given information, may include one piece of transaction data or may include plural pieces of transaction data. However, a fee for each transaction is included in a fee that may be received by the generating device 10, and therefore it is advantageous for the generating device 10 to generate a block in such a manner that the number of transactions is increased.

Hereinabove, a blockchain program and a blockchain method have been described by way of the foregoing embodiment; however, a blockchain program and a blockchain method according to the embodiments are not limited to the foregoing embodiment and various modifications and improvements may be made without departing from the scope of the embodiments. When there are a plurality of the foregoing embodiments and modifications, they may be combined to the extent not inconsistent herewith.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium having stored therein a blockchain program for causing a computer to execute a process of generating data on a new blockchain by linking a new block to data on a blockchain including a plurality of blocks linked together each being a set of data containing given information, the process comprising:
   in generating a second block following a first block included in the data on the blockchain, identifying, among branch blocks approved prior to the generating of the second block, one or more blocks capable of being approved in parallel with the first block, and
   generating and registering, in a memory, the second block following the first block and the one or more blocks capable of being approved in parallel with the first block,
   when, in a set of all combinations of the branch blocks, transactions having the same identification information of a virtual currency fragment in input information of the transactions are present in different blocks included in a combination, the identifying excludes blocks included in the combination and identifies one or more blocks included in combinations other than the combination including the excluded blocks as one or more blocks capable of being approved in parallel with the first block.

2. The non-transitory computer-readable storage medium according to claim 1, wherein
   the identifying identifies, among blocks that are the branch blocks and that are linked from a block preceding the first block, one or more blocks capable of being approved together with the first block.

3. The non-transitory computer-readable storage medium according to claim 1, the process further comprising calculating a length of the blocks to be linked by adding the number of the first block and the identified one or more blocks capable of being approved in parallel with the first block.

4. The non-transitory computer-readable storage medium according to claim 3, wherein the calculating calculates a reward for the generating and registering of the second block in accordance with the length of the blocks to be linked.

5. A blockchain method of generating data on a new blockchain by linking a new block to data on a blockchain including a plurality of blocks linked together each being a set of data containing given information, the method comprising:
   in generating a second block following a first block included in the data on the blockchain, identifying, among branch blocks approved prior to the generating of the second block, one or more blocks capable of being approved in parallel with the first block, and
   generating and registering, in a memory, the second block following the first block and the one or more blocks capable of being approved in parallel with the first block,
   when, in a set of all combinations of the branch blocks, transactions having the same identification information of a virtual currency fragment in input information of the transactions are present in different blocks included in a combination, the identifying excludes blocks included in the combination and identifies one or more blocks included in combinations other than the combination including the excluded blocks as one or more blocks capable of being approved in parallel with the first block.

6. The blockchain method according to claim 5, wherein the identifying identifies, among blocks that are the branch blocks and that are linked from a block preceding the first block, one or more blocks capable of being approved together with the first block.

7. The blockchain method according to claim 5, wherein the method further comprising: calculating a length of the blocks to be linked by adding the number of the first block and the identified one or more blocks capable of being approved in parallel with the first block.

8. The blockchain method according to claim 7, wherein the calculating calculates a reward for the generating and registering of the second block in accordance with the length of the blocks to be linked.

* * * * *